United States Patent Office 2,783,217
Patented Feb. 26, 1957

2,783,217

COPOLYMERS OF A PERFLUOROCHLOROETHYLENE AND A HYDROCARBON DIENE AND METHOD FOR THEIR MANUFACTURE

Francis J. Honn, Bloomfield, and Willard M. Sims, Hackensack, N. J., assignors to The M. W. Kellogg Company, Jersey City, N. J., a corporation of Delaware Application November 18, 1952, Serial No. 321,144

1 Claim. (Cl. 260—82.1)

This invention relates to copolymers of a perfluorochloroethylene. In one aspect, the invention relates to copolymers of a perfluorochloroethylene and a hydrocarbon diene. In a still more particular aspect, the invention relates to copolymers of trifluorochloroethylene with butadiene or isoprene; and copolymers of difluorodichloroethylene with butadiene or isoprene. In another aspect, the invention relates to the manufacture of such copolymers.

Butadiene and isoprene have been employed as bases for many synthetic, rubber-like materials. Their homopolymers are rubbers, which may be readily swollen by solvents even in the vulcanized state. As an accumulative group, the synthetic rubber-like substances offer wide utility, serving not only as substitutes for natural rubber, but in some cases the properties of various individual synthetics are superior to the natural products, e. g., in oil-resistance and aging characteristics. Halogen-containing polymers or copolymers, have been found to be relatively inert and to possess good physical and chemical stability. By reason of these characteristics, the halogen-containing copolymers have many useful applications, such as for coating surfaces to render them corrosion-resistant, as insulators and as molded articles of manufacture.

However, neither a natural nor a synthetic rubber has been developed, prior to this invention, which is sufficiently oil and fuel-resistant, flexible at relatively low temperatures, and at the same time possessing the corrosion-resistant properties and chemical inertness of the halogen-containing polymers.

It is, therefore, an object of this invention to provide new copolymers having desirable physical and chemical characteristics, exhibiting the dual properties of corrosion-resistance to oil, fuels and other powerful reagents, as well as flexibility at relatively low temperatures.

Another object of this invention is to provide a method for the manufacture of such copolymers.

Various other objects and advantages of the present invention will become apparent to those skilled in the art from the accompanying description and disclosure.

The polymers of the present invention are thermoplastic copolymers of a perfluorochloroethylene, such as trifluorochloroethylene or difluorodichloroethylene, and a hydrocarbon diene such as butadiene or isoprene. The copolymers of the present invention contain between about 5 mol percent and about 50 mol percent of perfluorochloroethylene and the remaining major constituent is a hydrocarbon diene. In general, as more fully hereinafter described, these copolymers are prepared by copolymerizing the perfluorochloroethylene (e. g., trifluorochloroethylene or difluorodichloroethylene) with the hydrocarbon diene (e. g., butadiene or isoprene) at temperatures between about 5° C. and about 75° C. in the presence of a polymerization recipe, containing a polymerization catalyst, under alkaline conditions. The copolymerization of the aforementioned monomers produces rubber-like copolymers. These copolymers are flexible and elastic, even at low temperatures, vulcanizable, chemically and thermally stable, oil and fuel-resistant, and can be processed by conventional molding methods.

The copolymers are prepared in accordance with various comonomer ratios and by means of various polymerization recipes, such as the cumene-redox or "Mutual GR–S" type recipe. The recipes may be varied to yield copolymers accentuating desired physical and chemical properties. As indicated above, the polymerization is carried out under alkaline conditions within the aforementioned temperature range between about 5° C. and about 75° C.; with a temperature between about 20° C. and about 60° C. being preferred. Preferably a pH between about 9 and 11 is maintained during the polymerization reaction. The catalyst in the cumene-redox recipe may, for example, preferably comprise between about .05 to 0.15 part by weight of cumene hydroperoxide; while the catalyst in the "Mutual GR–S" recipe may, for example, preferably comprise between about 0.1 to 0.5 part by weight of potassium persulfate. However, it should be noted that either type catalyst may be also present over the broad range of 0.01 to 1.0 part by weight. The copolymerization employing a cumene-redox recipe and a "Mutual GR–S" recipe, with various catalytic agents is described in more detail in the examples hereinafter given. The copolymerization of trifluorochloroethylene with either butadiene or isoprene, and the copolymerization of dichlorodifluoroethylene with either butadiene or isoprene, proceeds smoothly in fatty acid soap emulsions with a cumene-redox catalyst at approximately 20° C., and with a persulfate catalyst at approximately 50° C. Various other free radical polymerization systems may also be employed.

To attain all the advantages inherent in each of the aforementioned copolymer systems, the copolymers of any desired composition must be as uniform as possible, that is, each polymeric molecule must contain essentially the same proportion of the trifluorochloroethylene or dichlorodifluoroethylene monomer to the butadiene or isoprene monomer, as every other polymeric molecule in the batch. In other words, the molar ratio in a polymeric molecule should correspond as closely as possible to the other molecules in the same batch. If the respective copolymers are heterogeneous, the desired physical and chemical properties may tend to be distorted. The copolymeric chain, containing a disproportionately high concentration of either butadiene or isoprene, will be unduly swollen by the action of solvent, and the oil and fuel resistance of the entire batch will, therefore, be adversely affected. A deficiency of either butadiene or isoprene monomer tends to decrease the flexibility of the corresponding copolymer.

We have found in the aforementioned copolymerization of trifluorochloroethylene with either butadiene or isoprene, and in the copolymerization of dichlorodifluoroethylene with either butadiene or isoprene, that the butadiene and isoprene monomers react more readily than do the trifluorochloroethylene or dichlorodifluoroethylene monomers. No feed consisting of pure trifluorochloroethylene and pure butadiene or isoprene, and no feed consisting of pure dichlorodifluoroethylene and pure butadiene or isoprene, will yield a copolymer of the same composition as the feed. Due to the greater reactivity of the butadiene and isoprene monomers, both the feed and the resulting copolymer will become richer in trifluorochloroethylene or dichlorodifluoroethylene as the polymerization reaction proceeds. If an attempt is made to prepare a particular copolymer ratio, by feeding a charge of constant composition (i. e., one which has been calculated to yield instantaneously a copolymer of desired composition) the less reactive monomer will lag in the reaction. The copolymer becomes, at first, excessively rich in the more reactive monomer and assumes, to a greater degree than desired, the properties of the butadiene or isoprene homopolymer. As the relative concentration of the less reactive monomer (e. g., trifluorochloroethylene or dichlorodifluoroethylene) to the more reactive monomer (e. g., butadiene or isoprene) increases, the trifluorochloroethylene or dichlorodifluoroethylene is drawn more and more into the reaction. The copolymer which is produced becomes richer in respect to that monomer and assumes to a greater degree the properties of the trifluorochloroethylene or dichlorodifluoroethylene homopolymer. This unevenness of reaction leads to an excessive spread of molar ratios found in the resulting copolymer.

In view of the inequality of reactivity, procedures for charging the monomers to the reactors either in increments or continuously in such a manner that the polymer composition from chain to chain varies for not more than ±2 mol percent, have been devised.

To carry out the above-mentioned procedure, monomer reactivity ratios for trifluorochloroethylene and either butadiene or isoprene, and monomer activity ratios for dichlorodifluoroethylene and either butadiene or isoprene are calculated in accordance with the Mayo, Lewis and Walling equation. This equation is represented as follows:

$$*\frac{d(M_1)}{d(M_2)} = \frac{(M_1)}{(M_2)} \frac{r_1(M_1)+(M_2)}{(M_1)+r_2(M_2)}$$

wherein $r_1$ and $r_2$ are parameters, $M_1$ and $M_2$ are concentrations in moles of monomer 1 and monomer 2. The equation describes the composition of the copolymer being formed at any instant, $$\frac{d(M_1)}{d(M_2)}$$

from a polymerization mixture of two monomers at concentrations $M_1$ and $M_2$ by means of two parameters, $r_1$ and $r_2$. These parameters (i. e., the monomer reactivity ratios), each represent the ratio of two rate constants for the reaction of a chain with a given monomer unit on the growing end with its own type of monomer, and with the other type of monomer. These values have been found to be as follows:

For trifluorochloroethylene and butadiene, respectively, they are $r_1=0.0$ and $r_2=1.35$; for trifluorochloroethylene and isoprene, respectively, they are $r_1=0.0$ and $r_2=1.3$ to 1.4; for dichlorodifluoroethylene and butadiene, respectively, they are $r_1=0.0$ and $r_2=0.8$; and for dichlorodifluoroethylene and isoprene, respectively, are $r_1=0.0$ and $r_2=0.45$.

Instantaneous copolymer feed-composition diagrams, derived from the above values are shown in the accompanying drawings, in which—

Figure 1:
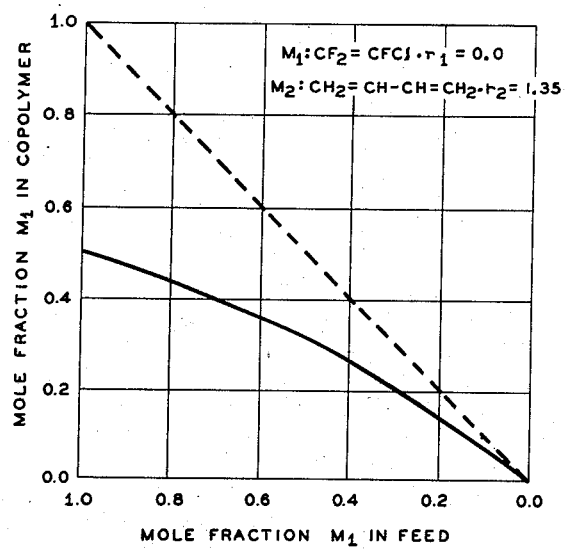
Figure 1 is a diagram from which the proper feed may be selected for the instantaneous preparation of a copolymer of desired composition having up to 50 mol percent of trifluorochloroethylene and the remaining constituent being butadiene.
Figure 2:
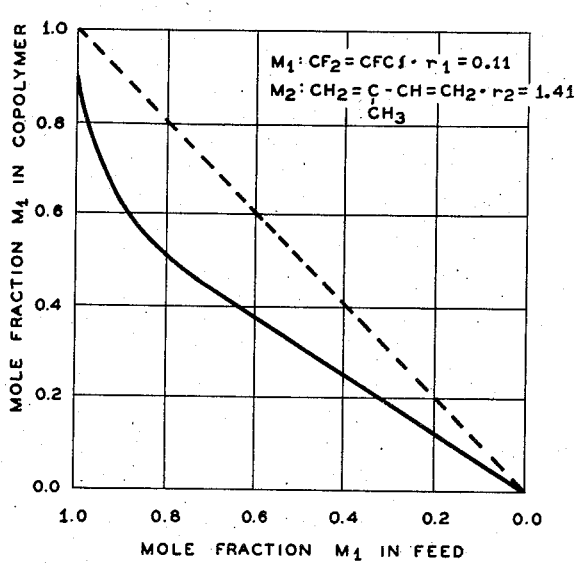
Figure 2 is a diagram from which the proper feed may be selected for the instantaneous preparation of a copolymer of desired composition having up to 50 mol percent of trifluorochloroethylene and the remaining constituent being isoprene.
Figure 3:
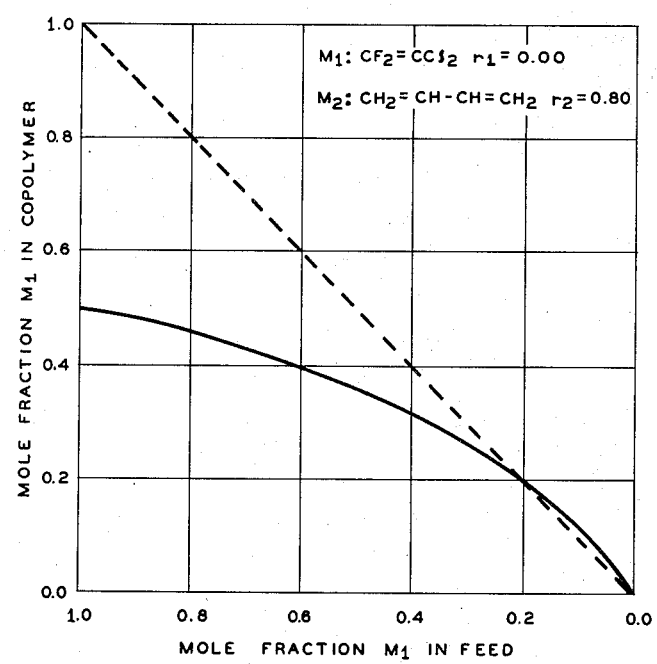
Figure 4:
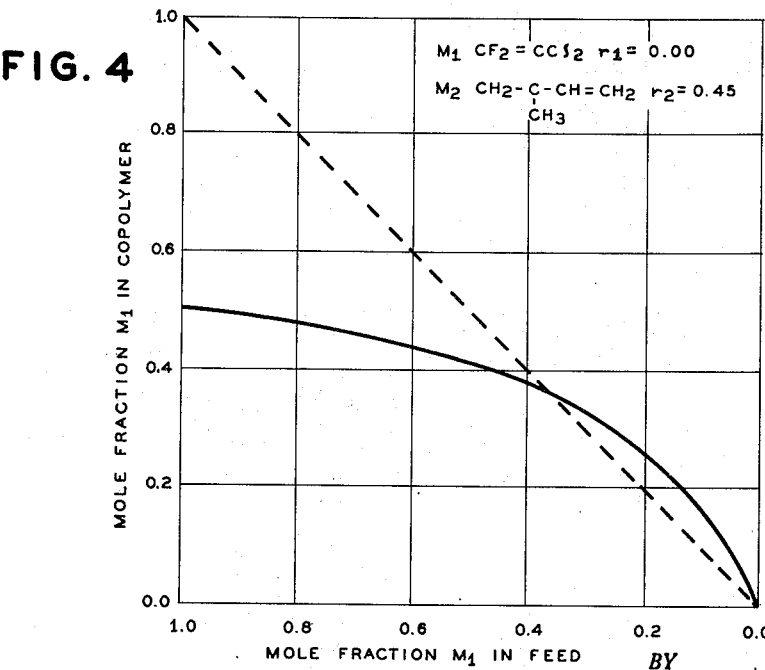

Figure 3 is a diagram from which the proper feed may be selected for the instantaneous preparation of a copolymer of desired composition having up to 50 mol percent of dichlorodifluoroethylene and the remaining constituent being butadiene; and Figure 4 is a diagram from which the proper feed may be selected for the instantaneous preparation of a copolymer of desired composition having up to 50 mol percent of dichlorodifluoroethylene and the remaining constituent being isoprene.

* Reference: "Copolymerization," F. R. Mayo and Cheves Walling, Chemical Reviews, vol. 46, pages 195–197.

Inasmuch as the above values are instantaneous, when considered alone, they do not compensate for the increase in concentration of one of the monomers during the copolymerization reaction. It has been found that trifluorochloroethylene and butadiene copolymers or trifluorochloroethylene and isoprene copolymers of molar ratios of 10:90, or less, may be carried out to a 60 percent conversion with tolerable molar ratio spreads of ±2 mol percent by the use of one initial charge. It has also been found that dichlorodifluoroethylene and butadiene copolymers, and dichlorodifluoroethylene and isoprene copolymers, of molar ratios of 5:95, or less, may be carried out to a 50 percent conversion with tolerable molar ratios spreads of ±2 mol percent, by the use of one initial charge. However, the tendency toward heterogeneity is magnified as one attempts to introduce still larger amounts of the less reactive monomers into the copolymers. The proper molar ratio of the initial charge can be determined from the respective figures in the drawings, which will, at the instant polymerization starts, yield a copolymer of desired molar ratio.

It will be seen from the aforementioned diagrams, for instantaneous copolymer-feed compositions, that there is an azeotropic feed at which copolymer and feed composition remain identical over the entire conversion scale. Thus, the respective values indicate that the trifluorochloroethylene radical can not add trifluorochloroethylene, but must add butadiene or isoprene; whereas, the butadiene or isoprene radicals may add either trifluorochloroethylene or butadiene or isoprene monomer, respectively, but prefer to add trifluorochloroethylene. Likewise, the values indicate that the dichlorodifluoroethylene radical can not add dichlorodifluoroethylene, but must add either butadiene or isoprene; whereas, the butadiene or isoprene radical may add either dichlorodifluoroethylene or butadiene or isoprene monomer, respectively, but prefer to add dichlorodifluoroethylene.

It should be noted that as the concentration of the less reactive monomer increases, thereafter, increment charges, of such composition as is designed to restore or maintain the molar ratio of the monomer phase at or near the initial molar level, are added. The number of increment feedings will be governed by the molar spread which may be tolerated. When the increment charges become so numerous as to be practically continuous, a charge of constant composition (this composition being equal to the molar ratio of the polymer desired), is pumped into the polymerization reactor at a rate equal to the rate of polymerization. The variations involved in continuous feeding will be limited to the errors imposed by the pumping apparatus itself.

It will also be noted, from the aforementioned diagrams, that at various respective comonomer levels, the systems become essentially azeotropic, thus, e. g., considering copolymer systems of dichlorodifluoroethylene and isoprene, as in Figure 4, it will be noted that at the 40:60 molar dichlorodifluoroethylene:isoprene level, the system is essentially azeotropic so that over the entire range of up to approximately 100 percent conversion, the composition varies by less than ±1 percent. Due to the greater reactivity of dichlorodifluoroethylene at molar ratios below the azeotropic point, the dichlorodifluoroethylene is consumed at a disproportionate rate, and the feed and copolymer becomes richer in isoprene as the copolymerization proceeds up to a 60 percent conversion. At molar ratios above the azeotropic point, the feed and copolymer become richer in dichlorodifluoroethylene as the copolymerization proceeds. If an attempt is made to prepare a particular copolymer ratio other than the azeotropic molar ratio, by feeding a single charge, one of the monomers will lag in the reaction.

As an example, at the 25:75 dichlorodifluoroethylene:isoprene molar copolymer level, where the initial monomer feed must be approximately 18:82, the instantaneous copolymer composition at 60 percent conversion is altered to 18:82 giving rise to a spread of 7 percent in dichlorodifluoroethylene content. In the case of a 10:90 molar ratio, above 70 percent conversion, the product is pure polyisoprene.

The copolymers of the present invention are soluble in a number of solvents. Among the preferred solvents are aromatics such as benzene, xylene and toluene; and also chlorinated solvents such as carbon tetrachloride and trichloromethane. These copolymers are all soluble, in the aforementioned solvents, at room temperature. However, if cross-linkage has taken place between the copolymer molecules themselves, the copolymers will not be soluble in the aforementioned solvents but will assume the gel condition. At the point where the gel condition takes place, the copolymers become insoluble in the solvents.

The copolymers of the present invention do not possess any real melting point. Rather, they will either soften or decompose when subjected to sufficiently high temperatures. These temperatures, however, cannot be readily ascertained, since the softening or decomposition point for a given copolymer will vary with the molecular weight. In general, the higher the molecular weight of the copolymer, the higher will be the softening or decomposition point. It should also be noted that if one attempts to make a trifluorochloroethylene or dichlorodifluoroethylene copolymer (with either butadiene or isoprene) containing more than 50 mol percent of the perfluorochloroethylene monomers, copolymerization will not take place. On the other hand, when the perfluorochloroethylene monomer is present in an amount which is less than 5 mol percent, although copolymerization may take place, a rubbery material is not obtained which possesses the properties, and the aforementioned desired characteristics of the copolymers are lost.

In general, the feed composition will comprise between about 3% and about 99% by weight of the trifluorochloroethylene or dichlorodifluoroethylene monomer and the remainder of the copolymer feed being made up of either the butadiene or isoprene monomer.

The following examples are offered as a better understanding of the present invention and are not to be construed as limiting its scope.

EXAMPLE 1

This example is intended to illustrate the preparation of a copolymer of trifluorochloroethylene and butadiene employing the cumene-redox recipe:

A soap solution was prepared according to the following procedure: 5 parts of Korr[1] soap and 150 parts of water were heated to 75° C. until the entire quantity of soap was dissolved. The resulting solution was cooled to 30° C. and the pH adjusted to 10 with dilute hydrochloric acid or potassium hydroxide, as required. 0.20 part of cumene hydroperoxide and 0.35 part of dodecylmercaptan were added to this solution and thoroughly mixed to emulsify the mixture.

An activator solution was prepared according to the following procedure: 43 parts of water were heated to 90° C. under a nitrogen atmosphere. To this solution were added 1 part $Na_4P_2O_7 \cdot 10H_2O$ and 1 part of anhydrous dextrose. The temperature was held at 90° C. for approximately ten minutes. The resulting solution was then cooled to 60° C. and 0.10 part of $FeSO_4 \cdot 7H_2O$, dissolved in 7 parts of water, were added. The resulting solution was cooled to 30° C. and stored under nitrogen until used.

The aforementioned soap solution and the activator solution were next charged to a 300 ml. glass reactor tube.

[1] Potassium Rubber Reserve Soap, Procter and Gamble.

The contents of the tube were frozen in liquid nitrogen after each addition. The tube was then evacuated and 58.5 parts of butadiene and 41.5 parts of trifluorochloroethylene were flash-distilled into the tube. The tube was then sealed under vacuum.

Following the aforementioned charging to the glass reactor tube, polymerization was made to take place by shaking the tube at room temperature (25°–35° C.) for a period from 1 to 24 hours. The polymer emulsion was then coagulated by freezing. The rubber crumb was then water-washed free of soap and the resulting product dried in a vacuum at room temperature. The results obtained are shown in the following table:

| No. | Polymerization Time, hours | Percent Conversion | Mole Percent $CF_2=CFCl$ Combined |
| --- | --- | --- | --- |
| 1 | 1 | 11 | 10 |
| 2 | 5 | 70 | 19 |
| 3 | 7 | 76 | 20 |
| 4 | 24 | 77 | 20 |

EXAMPLE 2

This example is intended to illustrate the preparation of a copolymer of trifluorochloroethylene and butadiene in a stirred autoclave:

A soap solution was prepared according to the following procedure: 50 parts of soap and 1500 parts of water were heated to 75° C. until the entire quantity of soap was dissolved. The resulting solution was cooled to 30° C. and the pH adjusted to 10 with dilute hydrochloric acid or potassium hydroxide as required. 1 part of cumene hydroperoxide (75 percent strength) and 4.35 parts of dodecylmercaptan were added to this solution and thoroughly mixed to emulsify the mixture.

An activator solution was prepared according to the following procedure: 450 parts of water were heated to 90° C. under a nitrogen atmosphere. To this solution were added 10 parts of $Na_4P_2O_7 \cdot 10H_2O$ and 10 parts of anhydrous dextrose. The temperature was held at 90° C. for approximately ten minutes. The resulting solution was then cooled to 60° C. and .01–2 parts of $FeSO_4 \cdot 7H_2O$, dissolved in 50 parts of water were added. The resulting solution was then cooled to 30° C. and held under nitrogen until used.

The aforementioned soap solution and the activator solution were next poured into the autoclave, previously flushed with nitrogen. The autoclave was closed and 274 parts of trifluorochloroethylene and 726 parts of butadiene were forced in, as liquids, under nitrogen pressure.

The resulting batch, was next stirred with an anchor type agitator, rotating at 48 R. P. M. for 21 hours at a temperature between about 20° C. and about 22° C. under an autogenous pressure of 75 p. s. i. The residual monomer was vented and the reaction was shortstopped with 1.6 parts of dinitrochlorobenzene dissolved in 10 parts of benzene. The product was stabilized toward oxidation by dispersing 9.6 parts of 2.5 di-tertiary butyl hydroquinone in the latex. The latex was then coagulated by slowly adding 500 parts of $NaCl/H_2SO_4$ aqueous solution. The product was then water-washed free of soap and dried in a vacuum at a temperature of 35° C. The yield of polymer was found to be 28%, with 12.5±2 mol percent trifluorochloroethylene combined.

EXAMPLE 3

This example is intended to illustrate the preparation of a copolymer of trifluorochloroethylene and butadiene employing a "Mutual GR–S" type recipe:

A soap solution was prepared according to the following procedure: 50 parts of soap and 1900 parts of water were heated to 75° C. until the entire quantity of soap was dissolved. The resulting solution was then cooled to 30° C. and the pH was adjusted to 10.2, with dilute hydrochloric acid or potassium hydroxide, as required. 4.25 parts of dodecylmercaptan were added to this solution. A catalyst solution was then prepared by dissolving 3 parts of $K_2S_2O_8$ in 100 parts of water.

The soap and catalyst solutions were then poured into an autoclave, previously flushed with nitrogen. The autoclave was closed and 274 parts of trifluorochloroethylene and 726 parts of butadiene were forced into it as liquids under nitrogen pressure. The resulting batch was stirred with an anchor type agitator, rotating at 48 R. P. M. for 24 hours at a temperature of approximately 50° C. under an autogenous pressure of 120 p. s. i. The reaction was then shortstopped by adding 1.6 parts of hydroquinone dissolved in 100 parts of water. The polymer was then stabilized by dispersing 9.6 parts of 2,5 di-tertiary butyl hydroquinone in the latex. The latex was then coagulated by adding 750 ml. $NaCl/H_2SO_4$ in aqueous solution (prepared by dissolving 20 ml. of concentrated $H_2SO_4$ and 500 gms. NaCl in 1 gallon of water). The resulting rubbery crumb was water-washed free of soap and the product dried in a vacuum at 35° C.

The yield of polymer was found to be 87%, with 13.6 mol percent trifluorochloroethylene combined.

EXAMPLE 4

This example illustrates the preparation of low molar ratio trifluorochloroethylene and butadiene copolymers, with a single initial charge, using either the aforementioned cumene-redox or Mutual GR–S type recipe:

An adequately homogeneous 10:90 mols trifluorochloroethylene/butadiene copolymer was carried to a 10% conversion with a single initial charge of a 15:85 molar ratio. The final average copolymeric composition was found to be 11.6±2 mol percent trifluorochloroethylene.

EXAMPLE 5

This example illustrates the preparation of a 25:75 molar trifluorochloroethylene/butadiene copolymer with a single initial charge, employing either of the aforementioned recipes:

The initial feed consisted of a 40:60 molar ratio. At a 60% conversion, the feed was found to have altered to a 58:42 molar ratio, and the instantaneous copolymer composition to 34:66 molar ratio. The resulting product, as a whole, was then found to have an average composition of approximately 28.5 mol percent of trifluorochloroethylene with a spread of 9 mol percent.

EXAMPLE 6

This example illustrates the increment feeding employed in the preparation of 25:75 mols trifluorochloroethylene/butadiene copolymer, employing either of the aforementioned recipes:

An initial charge of 50% total monomer (with a composition equal to a 40:60 molar ratio) was followed at the 15%, 30% and 45% conversion levels with three identical increments (with a composition equal to a 25:75 molar ratio) to produce a polymer at a 60% conversion with an average composition of 26.5 mol percent trifluorochloroethylene, and a maximum spread of 3 mol percent trifluorochloroethylene.

EXAMPLE 7

This example illustrates the preparation of a 25:75 mols trifluorochloroethylene/butadiene copolymer by a continuous feeding method, employing either of the aforementioned recipes:

An initial charge of 50% of the total monomer (with a composition equal to a 40:60 molar ratio) is followed by the remaining 50% (with a composition equal to a 25:75 molar ratio) pumped into a reaction vessel at a rate equal to the overall rate of polymerization. The product, as a whole, was found to have an average composition of 25.0 mol percent of trifluorochloroethylene, with a spread in composition no greater than the errors inherent to the proportioning pump.

The following examples illustrate the use of a cumene-redox recipe for preparing copolymers of trifluorochloroethylene and isoprene.

EXAMPLE 8

A soap solution was prepared by heating 5 parts of soap and 150 parts water to 75° C. until the entire quantity of soap was dissolved. The solution was cooled to 30° C. and the pH adjusted to 10 with 5% hydrochloric acid or 5% potassium hydroxide. To the resulting solution were added 0.20 part of cumene hydroperoxide and 0.19 part of dodecylmercaptan, to emulsify the mixture.

An activator solution was prepared according to the following procedure: 43 parts of water were heated to 90° C. under a nitrogen atmosphere. To this solution were added 1 part $Na_4P_2O_7.10H_2O$ and 1 part of anhydrous dextrose. The temperature was held at between about 80° C. and about 100° C. for approximately ten minutes. The resulting solution was then cooled to 60° C. and between about .01 and about 2 parts of $FeSO_4.7H_2O$, dissolved in 7 parts of water, were added. The resulting solution was cooled to room temperature and stored under nitrogen until used.

The above-mentioned soap solution and the activator solution, and 63.5 parts of isoprene, in that order, were charged to a 300 ml. glass reaction tube. The contents of the tube was frozen in liquid nitrogen after each addition. The tube was finally evacuated and 36.5 parts of trifluorochloroethylene were distilled into it. The tube was then sealed under vacuum.

Following the aforementioned charging to the glass reactor tube, polymerization was made to take place by shaking the tube at room temperature (25–35°C.), over a period of 24 hours. At the end of the polymerization period, the emulsion was frozen to effect coagulation, the rubber crumb was washed free of soap with distilled water and dried free with vacuum at room temperature. The mol percent of trifluorochloroethylene in the copolymer was found to be 22%.

EXAMPLE 9

This example illustrates the preparation of a copolymer of trifluorochloroethylene and isoprene employing the aforementioned recipe and a pressure system: The soap and activator solutions were prepared as described in Example 8.

A one gallon, stainless steel autoclave equipped with an anchor type agitator turning at 285 R. P. M., and a cooling heating jacket, was charged with eight times the standard recipe batch as follows: The soap and activator solutions and the isoprene were added quickly and in succession to the autoclave which had been flushed with nitrogen. The autoclave was closed and the trifluorochloroethylene monomer was forced in as a liquid under nitrogen pressure.

The resulting batch was stirred at 26° C. for 18 hours under an autogenous pressure of 85 p. s. i. The residual monomer pressure was then relieved and the reaction short stopped by the addition of 1.6 parts of dinitrochlorobenzene dissolved in 10 parts of benzene.

The resulting polymer was protected from oxidative degradation by the dispersion of 9.6 parts of 2,5 di-tertiary butyl hydroquinone in the latex. The latex was then coagulated by the addition of 600 parts of a dilute $NaCl/H_2SO_4$ aqueous solution (previously described). The resulting fine, rubbery crumb was washed with distilled water and dried in a vacuum at room temperature. The conversion of monomer to polymer was found to be 92%, and the mol percent of trifluorochloroethylene combined was 25%.

EXAMPLE 10

A 25:75 molar trifluorochloroethylene/isoprene copolymer was prepared in a one-gallon autoclave employing the following "Mutual GR–S" recipe.

| | Parts by weight |
|---|---|
| Water, distilled | 200 |
| $CF_2=CFCl$ | 36.5 |
| $CH_2=C(CH_3)—CH=CH_2$ | 63.5 |
| Korr soap | 5.00 |
| $K_2S_2O_8$ | 0.30 |
| Dodecylmercaptan | 0.19 |
| pH of soap solution | 10.2 |

A soap solution was prepared as follows: 5 parts of soap in 190 parts of water were heated to 75° C., until the soap was dissolved. The solution was then cooled to 30° C. and the pH adjusted to 10.2. Thereafter, 0.19 part of dodecylmercaptan were then added.

A catalyst solution was prepared by dissolving 0.30 part of $K_2S_2O_8$ in 10 parts of water.

A reactor was flushed with nitrogen, and then, in succession, were added the aforementioned soap solution, the catalyst solution and isoprene. Trifluorochloroethylene was forced into the reactor as a liquid under nitrogen pressure.

The resulting batch was stirred at 48 R. P. M. for 20 hours at 50° C. under an autogenous pressure of 75 p. s. i. After relieving the residual monomer pressure, and cooling the autoclave to 25° C., the reaction was short stopped with 1.6 parts of hydroquinone dissolved in 100 parts of water.

The polymer was next stabilized by dispersing 9.6 parts of 2,5 di-tertiary butyl hydroquinone in the latex. The latex was coagulated by adding 600 parts of the aforementioned standard $NaCl/H_2SO_4$ solution. After washing the rubbery crumb with water, it was dried in vacuum at room temperature. The conversion was found to be 47%, and the combined trifluorochloroethylene was found to be 19 mol percent.

EXAMPLE 11

This example illustrates the type of increment feeding employed in the preparation of low molar ratio trifluorochloroethylene/isoprene copolymers by a cumene-redox recipe described in Example 8.

A 10:90 trifluorochloroethylene/isoprene copolymer was carried to a 60% conversion with a single charge of a 15:85 molar ratio. The final average copolymeric composition was found to be 11.6±2.0 mol percent of trifluorochloroethylene.

EXAMPLE 12

This example illustrates the preparation of a 25:75 mols trifluorochloroethylene/isoprene copolymer, employing a cumene-redox recipe described in Example 9, with a single initial charge. The initial feed was of a 40:60 molar ratio. At a 60% conversion, the feed was altered to a 58:42 molar ratio, and the instantaneous copolymer composition was altered to a 34:66 molar ratio. The product, as a whole, was found to have an average composition of 28.5 mol percent trifluorochloroethylene with a maximum spread of 9 mol percent trifluorochloroethylene.

EXAMPLE 13

This example illustrates the increment feeding employed in the preparation of a 25:75 mols trifluorochloroethylene/isoprene copolymer, employing a cumene-redox recipe previously described in Example 9.

An initial charge of 55 percent total monomer (with a composition equal to a 40:60 molar ratio) followed at the 15%, 30% and 45% conversion levels with three identical increments (with a composition equal to a 26:74 molar ratio) was found to produce a polymer at 60% conversion with an average composition of 26.5 mol percent trifluorochloroethylene and a maximum spread of 3 mol percent trifluorochloroethylene.

EXAMPLE 14

This example illustrates the preparation of a 25:75 trifluorochloroethylene/isoprene copolymer, employing the following cumene-redox recipe and employing a continuous feeding method.

| | Parts by weight |
|---|---|
| Water | 200 |
| $CF_2=CFCl$ | 36.5 |
| Isoprene | 63.5 |
| Korr soap | 5.0 |
| Cumene hydroperoxide (100%) | 0.075 |
| $Na_4P_2O_7 \cdot 10H_2O$ | 1.00 |
| $FeSO_4 \cdot 7H_2O$ | 0.10 |
| Dextrose | 1.00 |
| Dodecylmercaptan | 0.19 |
| pH of soap solution | 10.0 |
| Temperature, °F | 75.0 |
| Pressure, p. s. i. | 50 |
| Time, hours | 20 |
| Percent conversion | 26 |

An initial charge of 50 percent of the total monomer (with a composition equal to a 40:60 molar ratio) is followed by the remaining 50% (with a composition equal to a 25:75 molar ratio) pumped into the reaction vessel at a rate equal to the rate of copolymerization. The product, as a whole, was found to have an average composition of 25.0 mol percent trifluorochloroethylene, with a spread in composition no greater than the errors inherent in the proportioning pump.

EXAMPLE 15

This example is intended to illustrate the preparation of a copolymer of dichlorodifluoroethylene and isoprene:

5 parts of the aforementioned soap and 150 parts of water were heated to 75° C. until the entire quantity of soap was dissolved. The resulting solution was cooled to 30° C. and the pH adjusted to 10 with a 5% hydrochloric acid and/or 5% potassium hydroxide solution, as required. To this solution were added 0.20 part of cumene hydroperoxide and 0.19 part dodecylmercaptan, and mixed thoroughly to emulsify the mixture.

An activator solution was prepared as follows: 43 parts of water were heated to 90° C. under a nitrogen atmosphere. To this solution were added 1 part $$Na_4P_2O_7 \cdot 10H_2O$$

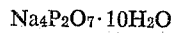

and 1 part of anhydrous dextrose. The temperature was held between about 80° C. and about 100° C. for approximately ten minutes. The resulting solution was then cooled to 60° C. and approximately 2 parts of $$FeSO_4 \cdot 7H_2O$$

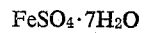

dissolved in 7 parts of water were added. The resulting solution was cooled to 30° C. and stored under nitrogen until used.

The aforementioned soap solution and the activator solution, and 33 parts of isoprene, were charged, in that order, to a 300 ml. glass reaction tube. The contents of the tube was frozen in liquid nitrogen after each addition. The tube was then evacuated and 67 parts of unsymmetrical dichlorodifluoroethylene were distilled into it. The tube was then sealed under vacuum.

Following the aforementioned charging to the glass reactor tube, polymerization was obtained by warming the tube to room temperature (25–35° C.) and the tube was shaken continuously for a period of 48 hours. At the end of the polymerization period, the emulsion was frozen to effect coagulation. The rubber crumb was washed free of soap in distilled water and dried in vacuum at room temperature. The yield of polymer was found to comprise 41 mol percent of unsymmetrical dichlorodifluoroethylene at an 82% conversion.

EXAMPLE 16

A 40:60 molar dichlorodifluoroethylene/isoprene copolymer was prepared in a one-gallon autoclave employing the following "Mutual GR-S" recipe.

| | Parts by weight |
|---|---|
| Water, distilled | 2000 |
| $CF_2=CCl_2$ | 566 |
| $CH_2=C(CH_3)-CH=CH_2$ | 434 |
| Korr soap | 50 |
| $K_2S_2O_8$ | 1.50 |
| Dodecylmercaptan | 2.00 |
| pH of soap solution | 10.2 |

A soap solution was prepared as follows: 50 parts of soap in 1900 parts of water were heated to 60° C., until the soap was dissolved. The solution was then cooled to 30° C. and the pH was adjusted to 10.2. Thereafter, 2 parts of dodecylmercaptan were added.

A catalyst solution was prepared by dissolving 1.50 parts of $K_2S_2O_8$ in 100 parts of water.

A reactor was flushed with nitrogen, and then, in succession, were added the aforementioned soap solution, the catalyst solution and the isoprene. The unsymmetrical dichlorodifluoroethylene was forced into the reactor as a liquid under nitrogen pressure.

The resulting batch was stirred at 48 R. P. M. for six hours at 50° C. under autogenous pressure. After relieving the residual monomer pressure and cooling the autoclave to 20° C., the reaction was shortstopped with 2 parts of hydroquinone dissolved in 100 parts of water. The resulting polymer was next stabilized by dispersing 5 parts of 2,5 di-tertiary butyl hydroquinone in the latex. The latex was then coagulated by adding 500 parts of the previously described $NaCl/H_2SO_4$ coagulant solution. After washing the rubbery crumb with water, it was dried in vacuum at room temperature. The conversion was found to be 85%, and the combined dichlorodifluoroethylene was found to be 39 mol percent.

EXAMPLE 17

This example illustrates the preparation of a 25:75 molar ratio dichlorodifluoroethylene/isoprene copolymer by a Mutual type recipe, as described in Example 16, with a single initial charge.

The initial feed comprised a 18:82 molar ratio. At a 60% conversion, the feed was altered to 11:89 molar ratio and the instantaneous copolymer composition to a 18:82 molar ratio. The product, as a whole, was then found to have an average composition of 21.5 mol percent of dichlorodifluoroethylene with a maximum spread of 7 mol percent of dichlorodifluoroethylene.

EXAMPLE 18

This example illustrates the increment feeding employed in the preparation of a 25:75 molar ratio of dichlorodifluoroethylene/isoprene copolymer, employing a Mutual type recipe, as previously described in Example 16.

An initial charge of 50% total monomer (with a composition equal to an 18:82 molar ratio) followed the 10% conversion interval levels with identical increments (with a composition equal to 25:75 molar ratio) was found to produce a polymer at 60% conversion with an average composition of 23 mol percent of dichlorodifluoroethylene and a maximum spread of ±2 mol percent of dichlorodifluoroethylene.

EXAMPLE 19

This example illustrates the preparation of a 25:75 molar ratio dichlorodifluoroethylene/isoprene copolymer, employing a Mutual type recipe, previously described in Example 16, employing a continuously feeding method.

An initial charge of 50% of the total monomer (with a composition equal to a 18:82 molar ratio) was followed by the remaining 50% (with a composition equal to a 25:75 molar ratio) pumped into the reaction vessel at a rate equal to the rate of copolymerization. The product, as a whole, was found to have an average composition of 25.0 mol percent of dichlorodifluoroethylene with a spread in composition no greater than the errors inherent in the proportioning pump.

EXAMPLE 20

This example illustrates the preparation of a 25:75 molar dichlorodifluoroethylene/butadiene copolymer, employing the following cumene-redox recipe:

| | Parts by weight |
|---|---|
| Water | 200 |
| $CF_2=CCl_2$ | 45 |
| Butadiene | 55 |
| Korr soap | 5.0 |
| Cumene hydroperoxide (100%) | Variable |
| (See table of results below) | |
| $N_4P_2O_7 \cdot 10H_2O$ | 1.00 |
| $FeSO_4 \cdot 7H_2O$ | 0.10 |
| Dextrose | 1.00 |
| Dodecylmercaptan | 0.33 |
| pH of soap solution | 10.0 |

A soap solution was prepared by heating 750 parts of water and 5 parts of the aforementioned soap to 75° C., until the soap was dissolved. The resulting solution was then cooled to 30° C. and the pH was adjusted to 10.0. Thereafter, the appropriate quantity of cumene hydroperoxide (75 percent strength) as shown in the following table of results, and 0.33 part of dodecylmercaptan were heated.

An activator solution was prepared by heating 43 parts of water to 90° C. under a nitrogen atmosphere. To this solution were added 1 part $Na_4P_2O_7 \cdot 10H_2O$ and 1 part of anhydrous dextrose. The temperature was held at 90° C. for approximately ten minutes. The resulting solution was then cooled to 60° C. and 0.1 part of $FeSO_4 \cdot 7H_2O$ in 7 parts of water were added. The resulting solution was cooled to 30° C. and stored under nitrogen until used.

The above-mentioned soap solution and activator solution were charged to a 300 ml. glass reaction tube. The contents of the tube was frozen in liquid nitrogen after each addition. The tube was evacuated, and into it were flash-distilled 45 parts of dichlorodifluoroethylene and 55 parts of butadiene. The tube was then sealed under vacuum.

Following the aforementioned charging to the glass reactor tube, polymerization was made to take place by shaking the tube at room temperature (25°–35° C.) for the required time, as indicated in the following table of results. At the end of the polymerization period, the reaction was shortstopped and the polymer emulsion (latex) was coagulated by freezing the tubes in liquid nitrogen. After dispersing the contents of the tubes, the rubbery crumb was water-washed free of soap. The product was dried in vacuum at 35° C. The following table, indicates the results obtained, following the above procedure, in several runs.

*Results*

| Run Number | Parts Cumene Hydroperoxide (100%) | Polymerization Time, hours | Percent conversion | Mol percent $CF_2=CCl_2$ Combined |
|---|---|---|---|---|
| 1 | 0.15 | 1 | 60 | 24 |
| 2 | 0.15 | 4 | 96 | 30 |
| 3 | 0.075 | 2 | 86 | 32 |
| 4 | 0.075 | 3 | 77 | 36 |

EXAMPLE 21

This example is intended to illustrate the preparation of dichlorodifluoroethylene/butadiene copolymers, which have given rise to rubber-like products.

The recipe and the procedure employed in Example 20, were repeated. The results obtained are indicated in the following table:

*Results*

| Run No. | Mols $CF_2=CCl_2$/Butadiene | | Polymerization Time, Hours | Percent Conversion |
|---|---|---|---|---|
| | Charged | Found | | |
| 1 | 40:60 | 36:64 | 1.5 | 74 |
| 2 | 40:60 | 43:57 | 3 | 70 |
| 3 | 50:50 | 38:62 | 47 | 77 |
| 4 | 75:25 | 38:62 | 47 | 33 |

In the preparation of the aforementioned "Mutual GR–S" and cumene-redox recipes, employed in accordance with the process of the present invention, various types of these recipes have been disclosed. However, it is possible to employ many variations in recipe compositions, in accordance with the following general recipes for the "Mutual GR–S" and cumene-redox type, for any of the copolymer systems disclosed:

GENERAL, "MUTUAL GR–S" RECIPE

| | Parts by weight |
|---|---|
| Water, distilled | 5–500 |
| $CF_2=CFCl$ or $CF_2=CCl_2$ | 100 |
| Korr soap | 0.5–10.0 |
| $K_2S_2O_8$ or $(NH_4)_2S_2O_8$ | .05–5.0 |
| Dodecylmercaptan (any straight-chain or branched mercaptan containing from 6 to 20 carbon atoms per molecule) | .05–5.0 |
| pH of soap solution | 7.5–11 |

GENERAL, CUMENE-REDOX RECIPE

| | Parts by weight |
|---|---|
| Water, distilled | 50–500 |
| $CF_2=CFCl$ or $CF_2CCl_2$ | 100 |
| Korr soap | 0.5–10.0 |
| Cumene hydroperoxide (100%) | .01–1.0 |
| $Na_4P_2O_7 \cdot 10H_2O$ | 0.1–10.0 |
| $FeSO_4 \cdot 7H_2O$ | .01–1.0 |
| Dextrose (or any other reducing sugar, e. g., fructose, levulose, etc.) | 0.1–10.0 |
| Dodecylmercaptan (includes any straight-chain or branched mercaptan containing from 6 to 20 carbon atoms per molecule) | .05–50 |

As previously indicated, the polymers of the present invention are thermoplastic copolymers of a perfluorochloroethylene, such as trifluorochloroethylene or dichlorodifluoroethylene, and a hydrocarbon diene such as butadiene or isoprene. It should be noted, however, that other perfluorochloroethylenes may also be employed in the preparation of the present invention, e. g., trichlorofluoroethylene. It is also possible to employ other hydrocarbon dienes in the preparation of the copolymers of the present invention, e. g., 1,2 dimethylbutadiene.

We claim:

A method for preparing a homogeneous copolymer of a perfluorochloroethylene, selected from the group consisting of trifluorochloroethylene and dichlorodifluoroethylene, and a hydrocarbon diene, selected from the group consisting of butadiene and isoprene, which comprises: polymerizing such a reaction mixture containing between about 18 mole percent and about 40 mole percent of the perfluorochloroethylene, in accordance with the respective figure of Figures 1 through 4 of the drawing, at a temperature between about 25° C. and about 50° C. in the presence of a polymerization promoter in an aqueous system, wherein the initial molar level is maintained by introducing a comonomer charge into the reaction zone having a composition equal to the molar ratio of the desired homogeneous copolymer product, and at a rate equal to the rate of copolymer formation.

References Cited in the file of this patent

UNITED STATES PATENTS

| 2,479,367 | Joyce | Aug. 16, 1949 |
| 2,496,384 | De Nie | Feb. 7, 1950 |

OTHER REFERENCES

Starkweather et al.: Industrial and Engineering Chem., vol. 39, pp. 210, 216 to 218, February 1947.

McBee et al.: Industrial and Engineering Chem., vol. 41, No. 1, pp. 70 to 72, January 1949.